(12) United States Patent
Kobayashi et al.

(10) Patent No.: US 8,487,060 B2
(45) Date of Patent: Jul. 16, 2013

(54) METHOD FOR PRODUCING POLYCHLOROPRENE LATEX, POLYCHLOROPRENE LATEX, AND ADHESIVE USING THE SAME

(75) Inventors: Naoki Kobayashi, Niigata (JP); Mikio Konno, Sendai (JP); Daisuke Nagao, Sendai (JP); Yoshihiro Mashiko, Itoigawa (JP); Toshiaki Otsu, Itoigawa (JP)

(73) Assignees: Denki Kagaku Kogyo Kabushiki Kaisha, Tokyo (JP); Tohoku University, Sendai-Shi, Miyagi (JP)

( * ) Notice: Subject to any disclaimer, the term of this patent is extended or adjusted under 35 U.S.C. 154(b) by 0 days.

(21) Appl. No.: 13/389,926

(22) PCT Filed: Aug. 17, 2010

(86) PCT No.: PCT/JP2010/063876
§ 371 (c)(1),
(2), (4) Date: Feb. 10, 2012

(87) PCT Pub. No.: WO2011/021626
PCT Pub. Date: Feb. 24, 2011

(65) Prior Publication Data
US 2012/0142859 A1   Jun. 7, 2012

(30) Foreign Application Priority Data
Aug. 21, 2009   (JP) .................. 2009-192029

(51) Int. Cl.
*C08F 2/26* (2006.01)
*C09J 111/02* (2006.01)

(52) U.S. Cl.
USPC .......... 526/295; 526/173; 526/181; 526/222; 526/225; 524/834

(58) Field of Classification Search
USPC ................. 524/834; 526/295, 173, 181, 222, 526/225
See application file for complete search history.

(56) References Cited

U.S. PATENT DOCUMENTS
2006/0063885 A1*   3/2006   Yashima et al. .............. 524/804

FOREIGN PATENT DOCUMENTS
| JP | 2006-199932 A | 8/2006 |
| JP | 2007-297502 A | 11/2007 |
| JP | 2008-222736 A | 9/2008 |
| JP | 2008-231404 A | 10/2008 |
| WO | 2004056889 A1 | 7/2004 |

* cited by examiner

*Primary Examiner* — Kelechi Egwim
(74) *Attorney, Agent, or Firm* — Roberts Mlotkowski Safran & Cole P.C.

(57) ABSTRACT

Provided is a polychloroprene latex extremely favorable in adhesive properties.
The present invention relates to a method of producing a polychloroprene latex, comprising polymerizing chloroprene or a mixture of chloroprene and a monomer copolymerizable with chloroprene in an aqueous medium containing a surfactant at a concentration of lower than its critical micelle concentration (CMC) and a polymer dispersant of a metal salt of aromatic sulfonic acid formalin condensate added thereto. The polymer dispersant for use is preferably a metal salt of aromatic sulfonic acid formalin condensate. The polychloroprene latex obtained can be used as an adhesive.

6 Claims, No Drawings

METHOD FOR PRODUCING POLYCHLOROPRENE LATEX, POLYCHLOROPRENE LATEX, AND ADHESIVE USING THE SAME

TECHNICAL FIELD

The present invention relates to a method of producing a polychloroprene latex by polymerization in aqueous medium and an adhesive produced by the method.

Polychloroprene-based adhesives have been mostly solvent-type, which are used as dissolved in an organic solvent such as toluene, hexane, ethyl acetate, methylethylketone, cyclohexane or the like, and thus, there was a concern about environmental pollution and the like. Thus, so-called aqueous adhesives, which do not use any organic solvent, have been developed eagerly. However, adhesives made with traditional polychloroprene latexes had a problem that the adhesiveness and the water resistance thereof were unsatisfactory.

BACKGROUND ART

Polychloroprene latexes were produced by the so-called emulsion polymerization method. In the emulsion polymerization method, chloroprene or a mixture of chloroprene and a monomer copolymerizable with chloroprene is emulsified in water with an emulsifier such as rosin acid soap, sodium alkylsulfate, higher alcohol sulfate ester sodium salt, polyoxyethylene alkyl ether, alkyl amine salt, quaternary ammonium salt or polyvinylalcohol and polymerized by addition of a radical initiator such as potassium persulfate. However, the polymerization method, which generally demands a large amount of emulsifier, inhibits expression of the adhesiveness inherent to polychloroprene, thus leading to drastic deterioration of the adhesive properties and the water resistance of the adhesive obtained. For that reason, there have been many attempts to develop a method of producing a polychloroprene latex having a reduced emulsifier content.

In emulsion polymerization of chloroprene, a polymer dispersant is used in combination with various surfactants in some cases for dispersion-stabilized polymerization and for improvement in various physical properties. Such polymer dispersants are generally lower in surface activity, but many of them are characteristic for example in their dispersion, aggregation and solubilization properties. Those having a relatively lower molecular weight form micelles similarly to emulsifiers, but those having a high molecular weight, which are similar in size to that of micelles, are considered not to form micelles. In particular, metal salts of aromatic sulfonic acid formalin condensates have been used commonly as the polymer dispersants in emulsion polymerization of chloroprene and they have been used widely as dispersants with strong dispersibility.

However when a polymer dispersant, such as a metal salt of aromatic sulfonic acid formalin condensate, is used, it is needed to add it to the aqueous medium in combination with an excessive amount of a surfactant (such as a polymer having emulsifier activity), which inevitably leads to deterioration in adhesive properties of the adhesive obtained (see, for example, Patent Documents 1, 2 and 3).

CITATION LIST

Patent Literatures

[Patent Literature 1] Japanese Unexamined Patent Application Publication No. 2008-222736

[Patent Literature 2] Japanese Unexamined Patent Application Publication No. 2007-297502

[Patent Literature 3] Japanese Unexamined Patent Application Publication No. 2006-199932

SUMMARY OF INVENTION

Technical Problem

As described above, there is an urgent need for a new polychloroprene latex with an improved adhesive properties such as initial strength, and an adhesive prepared by using the same and an object of the present invention is to satisfy such a need.

Solution to Problem

After intensive studies to solve the problems above, the inventors have found a method of producing a polychloroprene latex by adding a polymer dispersant of a metal salt of aromatic sulfonic acid formalin condensate to an aqueous medium containing a surfactant species at a concentration lower than its critical micelle concentration. They also found that the adhesive prepared by using the polychloroprene latex can overcome the traditional problems for example in initial adhesive strength significantly and made the present invention.

Specifically, the present invention relates to a method of producing a polychloroprene latex, comprising polymerizing chloroprene or a mixture of chloroprene and a monomer copolymerizable with chloroprene in an aqueous medium containing a surfactant at a concentration of lower than its critical micelle concentration (CMC) and a polymer dispersant of a metal salt of aromatic sulfonic acid formalin condensate added thereto.

The polymer dispersant may not be added during polymerization of chloroprene, but may be added previously before polymerization of chloroprene. In addition, polymerization of chloroprene in an aqueous medium with a polymer dispersant but without any surfactant added thereto leads to further improvement in quality of the adhesive. The amount of the polymer dispersant used is desirably 0.01 wt part or more and 0.1 wt part or less based on 100 wt parts of the aqueous medium.

The present invention also relates to a polychloroprene latex produced by the production method and an adhesive prepared by using the polychloroprene latex.

Advantageous Effect of Invention

It is possible according to the present invention to obtain a polychloroprene latex that is dispersed effectively and stably and mostly resistant to deposition during polymerization and gives an adhesive extremely favorable in adhesive properties such as initial adhesive strength, by polymerization of chloroprene in the presence of a metal salt of aromatic sulfonic acid formalin condensate, but without using a great amount of surfactant, in the polymerization step. In addition, the method demands shorter polymerization time, thus contributing significantly to increase in productivity. The polychloroprene latex obtained by the present invention contains no or only limited amounts of various surfactant species that lower the adhesive strength and thus, gives an adhesive that exhibits an initial adhesive strength inherent to chloroprene and is improved drastically in adhesiveness such as initial adhesive strength, which is thus favorably used for adhesion of papers, woods, cloths, jerseys, natural and synthetic leathers, rubbers, plastics, foams, ceramics, glasses, cement substrate and metals between the same or different species.

DESCRIPTION OF EMBODIMENTS

The surfactant for use in the present invention is not particularly limited, and examples of known surfactants include anionic surfactants, nonionic surfactants, cationic surfactants and others. Examples of the anionic surfactants include rosin acid salts, higher fatty acid salts, alkenylsuccinic acid salts, sodium alkylsulfate, higher alcohol sulfate ester sodium salts, alkylbenzenesulfonic acid salts, alkyldiphenyletherdisulfonic acid salts, sulfonate salts of higher fatty acid amide, sulfate ester salts of higher fatty acid alkylol amide, alkylsulfobetaines and the like; examples of the nonionic surfactants include polyoxyethylene alkyl ethers, polyoxyethylene sorbitan fatty acid esters, higher fatty acid alkanol amides, polyvinylalcohol; and examples of the cationic surfactants include alkylamine salts, quaternary ammonium salts and the like.

The metal salts of the aromatic sulfonic acid formalin condensate for use in the present invention are not particularly limited, and examples include sodium salts of naphthalenesulfonic acid formalin condensates, sodium salts of methylnaphthalenesulfonic acid formalin condensates, sodium salts of other special aromatic sulfonic acid formalin condensates and the like; and sodium salt of naphthalenesulfonic acid formalin condensate is commonly used and particularly favorable.

In the present invention, the surfactant is an emulsifier forming micelles (aggregate of surfactant) in aqueous medium when it is added in a greater amount. Metal salts of aromatic sulfonic acid formalin condensates have a volume similar to that of micelles and thus, do not form micelles in aqueous medium even when its addition amount is increased.

The present polymerization is characterized in that the polymerization is carried out with an added metal salt of aromatic sulfonic acid formalin condensate under the condition that there is an added surfactant species in the aqueous medium at a concentration of less than its CMC (including the case when the addition amount is zero). Preferably for increase of the initial adhesive strength, the surfactant is not added and the metal salt of aromatic sulfonic acid formalin condensate is added in an amount of 0.5 wt part or less based on 100 wt parts of the aqueous medium. More preferably, the surfactant is not added and the metal salt of aromatic sulfonic acid formalin condensate is added in an amount of 0.01 to 0.1 wt part based on 100 wt parts of the aqueous medium.

In the present invention, the term "A to B" means A or more and B or less and, when there is no unit indicated for A, the unit of A is the same as the unit of B (e.g., wt part).

The CMC is a CMC, as measured in pure water, and for example, the CMC of sodium dodecylbenzenesulfonate (DBS) is 1.2 mmol/dm$^3$·H$_2$O in pure water at 60° C. (as determined by conductivity method) and the CMC of sodium dodecylsulfate (SDS) is 8.1 mmol/dm$^3$·H$_2$O in pure water at 50° C. (as determined by surface tension method).

In the present invention, the value of CMC in pure water at 50° C. (as determined by surface tension method) is used, independently of the temperature of the aqueous medium actually used. When the aqueous medium actually used contains a medium other than water, the medium is assumed to be pure water and the concentration of the surfactant in the aqueous medium is adjusted to be less than the CMC in pure water at 50° C. For example if the surfactant is SDS, because the CMC of SDS is 8.1 mmol/dm$^3$·H$_2$O in pure water at 50° C., SDS is added to 1 dm$^3$ of the aqueous medium (containing water and others solvents) in an amount of less than 8.1 mmol.

The surfactants may be used in combination of two or more and, in this case, the maximum amount of all surfactants added is the CMC of a surfactant having the lowest CMC among the surfactant species added. In other words, the total amount of the surfactants in the aqueous medium is adjusted to be less than the CMC. For example, when surfactant A having a CMC of 1 mmol/dm$^3$·H$_2$O and surfactant B having a CMC of 2 mmol/dm$^3$·H$_2$O are used, the total concentration of the surfactants A and B is adjusted to be less than 1 mmol/dm$^3$·H$_2$O.

The aqueous medium for use in the present invention is a medium containing water at a rate of 50 wt % or more, and organic solvents such as alcohols may be added, but the content of water in the aqueous medium is preferably 90 wt % or more. When the addition amount of the organic solvents is 10 wt % or more and the water content is less than 90 wt %, it may exert adverse effect on the properties of the resulting chloroprene latex.

In the present invention, the method of adding the polymer dispersant containing a surfactant and a metal salt of aromatic sulfonic acid formalin condensate is not particularly limited, and any method, for example of adding it previously before polymerization or in portions during polymerization, may be used. Favorable for the purposes of increasing productivity and in particular of preparing a polychloroprene latex higher in initial adhesive strength is a method of adding only the metal salt of aromatic sulfonic acid formalin condensate previously before polymerization without addition of the surfactant species.

In the present invention, the chloroprene is the monomer of chloroprene (chloroprene monomer), specifically 2-chloro-1,3-butadiene. Examples of the monomers copolymerizable with chloroprene include 1,3-butadienes such as 2,3-dichloro-1,3-butadiene, 2-cyano-1,3-butadiene, 1-chloro-1,3-butadiene, 1,3-butadiene and isoprene; styrenes such as styrene, α-methyl styrene, p-chloro methyl styrene, p-cyano styrene, p-acetoxystyrene, p-styrenesulfonyl chloride, ethyl p-styrenesulfonyl, p-butoxy styrene, 4-vinylbenzoic acid, and 3-isopropenyl-α,α'-dimethylbenzyl isocyanate; methacrylic esters such as methyl methacrylate, glycidyl methacrylate, 2-hydroxyethyl methacrylate, 2-hydroxy propyl methacrylate, 4-hydroxybutyl methacrylate, 2-(dimethylamino)ethyl methacrylate, 2-(diethylamino)ethyl methacrylate, 3-(dimethylamino)propyl methacrylate, 2-(isocyanato) ethyl methacrylate, 2,4,6-tribromophenyl methacrylate, 2,2,3,3-tetrafluoropropyl methacrylate, 2,2,2-trifluoroethyl methacrylate, 2,2,3,3,3-pentafluoropropyl methacrylate and 2,2,3,4,4,4-hexafluorobutyl methacrylate; acrylic esters such as butyl acrylate, ethyl acrylate, 2-ethylhexyl acrylate, 2-ethoxyethyl acrylate, 2-butoxyethyl acrylate, cyclohexyl acrylate, 3-(trimethoxysilyl)propyl acrylate, 2,2,3,3-tetrafluoropropyl acrylate, 2,2,2-trifluoroethyl acrylate, 2,2,3,3,3-pentafluoropropyl acrylate and 2,2,3,4,4,4-hexafluorobutyl acrylate; acrylonitrile, methacrylonitrile, α-cyanoethyl acrylate, maleic anhydride, maleic acid, citraconic anhydride, vinylacetic acid, maleic acid esters, fumaric acid esters, crotonic acid, itaconic acid, fumaric acid, mono-2-(methacryloyloxy)ethyl phthalate, mono-2-(methacryloyloxy)ethyl succinate, mono-2-(acryloyloxy)ethyl succinate, methacrylic acid, acrylic acid, acrolein, diacetone acrylamide, vinyl methyl ketone, vinyl ethyl ketone, diacetone methacrylate and the like. Favorable among them from the point of high radical copolymerization efficiency with chloroprene are 2,3-dichloro-1,3-butadiene, 2-cyano-1,3-butadiene, 1-chloro-1,3-butadiene, styrene, methyl methacrylate, methacrylic acid, glycidyl methacrylate, 2-hydroxyethyl methacrylate, 2-hydroxypropyl methacrylate, 4-hydroxybutyl methacrylate, α-cyanoethyl acrylate, maleic anhydride and maleic acid. 2,3-dichloro-1,3-butadiene, which is highest in copolymerizablity with chloroprene, is more favorable. These compounds may be used in combination of two or more, as needed.

The addition amount of the chloroprene and the monomer copolymerizable with chloroprene is preferably 1 to 50 wt parts based on 100 wt parts of the aqueous medium, and it is possible to obtain a particularly stable polychloroprene latex, when the addition amount is in the range above.

The method of adding chloroprene is not particularly limited, but, it is preferable to add part of the chloroprene to the polymerization system continuously or intermittently during polymerization for acceleration of polymerization and improvement in productivity. For example, 10 to 50 wt parts of the entire chloroprene (100 wt parts) is added first to the polymerization system for initiation of polymerization and the remaining monomer, which is kept at a temperature lower than the polymerization temperature, is added to the polymerization system continuously for polymerization in the period from the time when the conversion rate reaches 1 to 40% to the time when polymerization ends. In such a case, in the present invention, there is no need to change the aqueous medium after initiation of polymerization and the polymerization of chloroprene can be carried out without adjustment such as neutralization. It is possible in the present invention to obtain a polychloroprene latex by polymerizing chloroprene continuously in the same aqueous medium.

The polychloroprene latex in the present invention is a homopolymer of chloroprene or a copolymer of chloroprene and a monomer copolymerizable with it. The gel content in the polychloroprene latex can be controlled by adjustment of the amount of the chain-transfer agent used during polymerization of chloroprene, polymerization temperature and polymerization rate, and it is preferable to take a measure of decreasing the amount of the chain-transfer agent, raising the polymerization temperature or increasing the polymerization rate for increase of the gel content.

The chain-transfer agent is not particularly limited, if it is an agent commonly used in production of polychloroprene, and examples thereof for use are known chain-transfer agents including mercaptans such as n-dodecylmercaptan, octylmercaptan, hexylmercaptan, t-butylmercaptan, thioglycol acid, thiomalic acid and thiosalicylic acid; sulfides such as diisopropylxanthic disulfide, diethylxanthic disulfide and diethylthiuram disulfide; halogenated hydrocarbons such as iodoform; diphenylethylene, p-chlorodiphenylethylene, p-cyanodiphenylethylene, α-methylstyrene dimer, sulfur and the like.

Examples of the catalysts used in polymerization of polychloroprene include peroxide compounds such as benzoyl peroxide, lauroyl peroxide, t-butyl hydroperoxide, p-menthane hydroperoxide, dicumyl peroxide, potassium persulfate and ammonium persulfate; azo compounds such as 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutylonitrile), 1,1'-azobis(cyclohexane-1-carbonitrile), 1-[(1-cyano-1-methylethyl)azo]formamide, dimethyl 2,2'-azobis(2-methylpropionate), 4,4'-azobis(4-cyanovaleric acid), 2,2'-azobis(2,4,4-trimethylpentane), 2,2'-azobis{2-methyl-N-[1,1'-bis(hydroxymethyl)-2-hydroxyethyl]propionamide}, 2,2'-azobis{2-(2-imidazolin-2-yl)propane]dihydrochloride, 2,2'-azobis{2-(2-imidazolin-2-yl)propane]disulfate dihydrate, 2,2'-azobis{2-[1-(2-hydroxyethyl)-2-imidazolin-2-yl)propane]}dihydrochloride, 2,2'-azobis(1-imino-1-pyrrolidino-2-methylpropane)dihydrochloride, 2,2'-azobis(2-methylpropionamidine)dihydrochloride and 2,2'-azobis[N-(2-carboxyethyl)-2-methylpropionamidine]tetrahydrate, and the like. Among them, use of potassium persulfate is preferable for particularly stabilized polymerization.

The amount thereof added is arbitrary, but an amount of about 0.01 wt part or more and less than 10 wt parts based on 100 wt parts of chloroprene is favorable. Addition of an ionic initiator in an amount of 10 wt parts or more leads to excessive increase in ionic strength, which in turn leads to instabilization of the particles. The method of adding the catalyst is not particularly limited, and may be, for example, collective addition, dropwise addition, divided addition or a combination thereof.

For example, sodium sulfite, ferrous sulfate, sodium anthraquinone-β-sulfonate, formamidinesulfonic acid, L-ascorbic acid or the like may be added together for improvement in activity of the catalyst used for polymerization of chloroprene.

A polymerization inhibitor, such as thiodiphenylamine, diethylhydroxylamine, hydroquinone, p-t-butyl catechol, 1,3,5-trihydroxybenzene, hydroquinone methylether, 2,6-di-t-butyl-4-methylphenol, 2,2-methylene-bis(6-t-4-methylphenol), 4,4-butylene-bis(6-t-butyl-3-methylphenol), ethylene bis(oxyethylene) bis[3-(5-t-butyl-4-hydroxy-m-tolyl)propionate], octadecyl-3-(3,5-di-t-butyl-4-hydroxyphenyl)propionate or pentaerythritol tetrakis[3-(3,5-di-t-butyl-4-hydroxyphenyl)propionate], may be added to terminate the polymerization of chloroprene.

The polymerization temperature is preferably in the range of 0 to 55° C. for control of polymerization. The polymerization temperature is particularly preferably in the range of 30 to 50° C. for smoother and safer polymerization reaction. Alternatively, the polymerization time is not particularly limited and may be determined arbitrarily according to the purpose, but is normally about 0.5 to 10 hours.

The solid matter concentration of the polychloroprene latex can be adjusted to a particular concentration by concentration or dilution with water. Higher solid matter concentration gives a latex that can be dried sooner and has a higher initial strength. The solid matter concentration can be also controlled by the ratio of the monomer during polymerization.

The polychloroprene latex is acidic immediately after polymerization, but the pH can be controlled arbitrarily for example with a pH adjuster. The pH adjuster is preferably a salt of weak acid and examples thereof include inorganic salts such as sodium carbonate, potassium carbonate, trisodium phosphate, disodium hydrogen phosphate, tripotassium phosphate, dipotassium hydrogen phosphate, tripotassium citrate, dipotassium hydrogen citrate, trisodium citrate, disodium hydrogen citrate, sodium acetate, potassium acetate and sodium tetraborate. The pH adjuster may be sodium hydroxide or potassium hydroxide, or alternatively a basic substance such as diethanolamine. The method of adding the pH adjuster is not particularly limited and a pH adjuster powder may be added directly or as diluted in water to a desired rate.

Although the polychloroprene latex obtained in the present invention is stable, a scaling inhibitor may be coated to form a coat film on the internal surface of the polymerization tank or the apparatuses connected thereto, for more stabilization of the basic properties of the polychloroprene latex. Compositions containing a hydroxynaphthalene compound can be used as the scaling inhibitors, and examples thereof that are commercially available include NOXOL WSW, NOXOL ETH and NOXOL ETH/S produced by CIRS, Inc.

The scaling inhibitor can be applied, for example, by coating with a roller or a brush or by spraying using a known atomizing apparatus such as sprayer or steam ejector. The coating amount, as the solid matter of scaling inhibitor, is in the range of 0.001 to 0.5 g/m$^2$, preferably in the range of 0.003 to 0.3 g/m$^2$ from the points of effectiveness and economy. The coated film may be heated at a temperature of 50° C. to 150° C. for preparation of a strong film. If it is likely that there is some staining that may inhibit film formation on the surface of the polymerization tank, it is preferable, before coating, to make clear metal surface exposed for example by cleaning the surface using an organic solvent or detergent or by washing the surface with pure water.

It is possible to make the effect more distinctive, by washing off the substance remaining on the surface of the polymerization tank with pure water after preparation of the coated film. It is possible to repeat polymerization operation several times before the effect obtained by one coating deteriorates. The frequency of coating varies according to the use condition and coating is preferably performed once again before deterioration of the effect. The coat film is preferably formed under the atmosphere of an inert gas such as nitrogen or argon. The material for the polymerization tank is for example stainless steel, which may be lined with glass or rubber.

EXAMPLES

Hereinafter, the present invention will be described more in detail with reference to Examples, but it should be understood that the present invention is not limited to these Examples. The "wt part" in Examples and Comparative Examples is a value based on 100 wt parts of chloroprene, unless specified otherwise.

A common 1500-ml four-necked glass separable flask equipped with a tilted paddle, a thermometer, a condenser tube and a nitrogen inlet was used as the polymerization reactor in the present invention. A blade with four plate-shaped baffles was used as the agitation blade.

Example 1

918.5 wt parts of pure water containing 0.02 wt part of sodium dodecylbenzenesulfonate (hereinafter, referred to as DBS for short, trade name: Neopelex G-65, manufactured by Kao Corp., the addition amount being as Neopelex G-65, not as pure DBS) and 0.500 wt part of sodium salt of β-naphthalenesulfonic acid formalin condensate (trade name: DEMOR N, hereinafter referred to simply as DEMOR N) was placed in a 1500-ml glass flask equipped with a three-way cock.

Then after sufficient nitrogen bubbling of the mixture, 100 wt parts of chloroprene was added thereto, and the mixture was heated to an internal temperature of 40° C. under a stirring condition of 300 rpm. After the heating, an aqueous initiator solution containing 4.44 wt parts of potassium persulfate (hereinafter, referred to simply as KPS) and 0.178 wt part of sodium anthraquinone-β-sulfonate and 217.5 wt parts of pure water was then added thereto collectively, for initiation of polymerization. The chloroprene polymerization conversion rate reached 81%, 2 hours after initiation of polymerization. There was almost no deposit observed on the container during recovery of the latex. The unreacted monomer was removed by rotary evaporator, to give a polychloroprene latex. The CMC of DBS in this Example was approximately 0.4 wt part (approximately 0.04 wt part in 100 wt parts of pure water at 50° C.).

The latex obtained was used as it was in the following tests without viscosity adjustment.

[Adhesion Test]

An adhesive composition was coated on two sheets of canvas (25×150 mm) at a load of 150 g(solid matter)/m$^2$ and left to stand at room temperature for 10 minutes. The coated surfaces were attached to each other, while they were still in completely wet state, and bonded to each other under pressure by 5 reciprocations of a hand roller. The sample was subjected to the following test on adhesive strength.

[Initial Peeling Strength]

After the sample was left to stand at room temperature for 10 minutes after the roller press, the 180° peeling strength of the sample was determined by using a tensile tester at a tensile speed of 200 mm/minute. The measurement results of the sample obtained in Example 1 are summarized in the following Table 1.

Example 2

458.3 wt parts of pure water containing 0.229 wt part of DEMOR N was placed in a 1500-ml glass flask equipped with a three-way cock; after thorough bubbling with nitrogen, 0.596 wt part of n-octylmercaptan and 100 wt parts of chloroprene were fed thereto; and the mixture was heated to an internal temperature of 40° C. under sufficient agitation. Then, an aqueous initiator solution containing 0.25 wt part of potassium persulfate and 12.5 wt parts of pure water was added collectively thereto for initiation of polymerization. The chloroprene polymerization conversion rate reached 88%, 3 hours after initiation of polymerization. There was almost no deposit observed on the container during recovery of the latex. The unreacted monomer was removed by rotary evaporator, to give a polychloroprene latex. The initial peeling strength of the sample was determined in a manner similar to Example 1. The measurement results of the sample obtained in Example 2 are summarized in the following Table 1.

Example 3

333.3 wt parts of pure water containing 0.167 wt part of DEMOR N was placed in a 1500-ml glass flask equipped with a three-way cock; after thorough bubbling with nitrogen, 0.27 wt part of n-octylmercaptan and 45.5 wt parts of chloroprene were fed thereto; and the mixture was heated to an internal temperature of 40° C. under sufficient agitation. Then, an aqueous initiator solution containing 0.19 wt part of potassium persulfate and 9.1 wt parts of pure water was added collectively thereto for initiation of polymerization. 0.33 wt part of n-octylmercaptan and 54.5 wt parts of chloroprene were added in portions, 1 hour after initiation of polymerization. The chloroprene polymerization conversion rate reached 90%, 3 hours after initiation of polymerization. There was almost no deposit observed on the container. The unreacted monomer was removed by rotary evaporator, to give a polychloroprene latex. The initial peeling strength of the sample was determined in a manner similar to Example 1. The measurement results of the sample obtained in Example 3 are summarized in the following Table 1.

Comparative Example 1

918.5 wt parts of pure water was placed in a 1500-ml glass flask equipped with a three-way cock. Then after sufficient nitrogen bubbling, 100 wt parts of chloroprene was added thereto, and the mixture was heated to an internal temperature of 40° C. under the stirring condition of 300 rpm.

After the heating, an aqueous initiator solution containing 2.22 wt parts of KPS and 0.089 wt part of sodium anthraquinone-β-sulfonate and 108.7 wt parts of pure water was then added thereto collectively for initiation of polymerization. However, there was an excessive amount of deposit in the polymerization tank 18 hours after initiation of polymerization, and thus, the polymerization was terminated.

Comparative Example 2

919.2 wt parts of pure water containing 0.72 wt part of DBS and 0.500 wt part of DEMOR N was placed in a 1500-ml glass flask equipped with a three-way cock; after thorough bubbling with nitrogen, 100 wt parts of chloroprene was fed thereto; and the mixture was heated to an internal temperature of 40° C. under the stirring condition of 300 rpm. After the heating, an aqueous initiator solution containing 4.44 wt parts of KPS and 0.178 wt part of sodium anthraquinone-β-sulfonate and 217.5 wt parts of pure water was then added thereto collectively for initiation of polymerization. The chloroprene polymerization conversion rate reached 90%, 1 hour after initiation of polymerization. There was almost no deposit observed on the container during recovery of the latex. The unreacted monomer was removed by rotary evaporator, to give a polychloroprene latex. The CMC of DBS in this Example was approximately 0.4 wt part (approximately 0.04 wt part in 100 wt parts of pure water at 50° C.). The initial peeling strength of the sample was determined in a manner similar to Example 1. The measurement results of the sample obtained in Comparative Example 2 are summarized in the following Table 1.

Comparative Example 3

100 wt parts of pure water, 4.0 wt parts of a disproportionated rosin acid, 1.0 wt part of potassium hydroxide and 0.8 wt part of sodium salt of βnaphthalenesulfonic acid formalin condensate were placed in a 1500-ml glass flask equipped with a three-way cock. After solubilization of the mixture, 100 wt parts of chloroprene and 0.1 wt part of n-dodecylmercaptan were added thereto, while the mixture was agitated. Polymerization was carried out at 10° C. under nitrogen environment, as potassium persulfate was used as the initiator. The chloroprene polymerization conversion rate reached 90%, 5 hours after initiation of polymerization. The unreacted monomer was removed by rotary evaporator, to give a polychloroprene latex.

The CMC of the disproportionated rosin acid used in this Example was approximately 0.43 wt part (also approximately 0.43 wt part in 100 wt parts of pure water at 50° C.). The initial peeling strength of the sample was determined in a manner similar to Example 1. The measurement results of the sample obtained in Comparative Example 3 are summarized in the following Table 1.

TABLE 1

| Number | Example | | | Comparative Example | | |
|---|---|---|---|---|---|---|
|  | 1 | 2 | 3 | 1 | 2 | 3 |
| Polymerization temperature (° C.) | 40 | 40 | 40 | 40 | 40 | 10 |
| Monomer addition amount (Monomer:pure water) | 100:1027 | 100:470 | 100:340*[1] | 100:1027 | 100:1027 | 100:100 |
| Addition amount of emulsifier (wt parts) | DBS | None | None | None | DBS | Disproportionated rosin acid |
|  | 0.02 | — | — | — | 0.72 | 4.000 |
|  | (0.002)*[2] | — | — | — | (0.070)*[2] | (4.000)*[2] |
| Addition amount of polymer dispersant (wt parts) | DEM OR N | DEM OR N | DEM OR N | None | DEM OR N | DEM OR N |
|  | 0.500 | 0.229 | 0.167 | — | 0.500 | 0.500 |
|  | (0.0487)*[2] | (0.0487)*[2] | (0.0487)*[2] | — | (0.0487)*[2] | (0.500)*[2] |
| Initiator addition amount (wt parts) | KPS | KPS | KPS | KPS | KPS | KPS |
|  | 4.44 | 0.25 | 0.19 | 2.22 | 4.44 | 0.10 |
| Polymerization time (hr) | 2 | 3 | 3 | Deposit formed in polymerization tank. | 1 | 5 |
| Polymerization rate (%) | 81 | 88 | 90 |  | 90 | 90 |
| Initial peeling strength [N/25 mm] | 0.9 | 2.5 | 7.5 | Terminated 18 hours after initiation of polymerization. | <0.01 (Unmeasurable due to low adhesiveness) |  |

*[1]The monomer was added, as divided.
*[2]wt parts in 100 wt parts of pure water

The invention claimed is:

1. A method of producing a polychloroprene latex, comprising polymerizing chloroprene or a mixture of chloroprene and a monomer copolymerizable with chloroprene in an aqueous medium containing a polymer dispersant of a metal salt of aromatic sulfonic acid formalin condensate added thereto,
wherein the polymer dispersant is added in an amount of 0.01 to 0.1 wt part based on 100 wt parts of the aqueous medium, and substantially no surfactant is added to the aqueous medium.

2. The method of producing a polychloroprene latex according to claim 1, wherein the polymer dispersant is added to the aqueous medium previously before polymerization of the chloroprene or the mixture of chloroprene and a monomer copolymerizable with chloroprene.

3. The method of producing a polychloroprene latex according to claim 1, wherein the polymerization is carried out in the aqueous medium not containing the surfactant.

4. A polychloroprene latex, obtained by the production method according to claim 1.

5. An adhesive, comprising the polychloroprene latex according to claim 4.

6. The method of producing a polychloroprene latex according to claim 1, wherein the mixture of chloroprene and a monomer copolymerizable with chloroprene is polymerized and the amount of the chloroprene and the monomer is 1 to 50 wt parts based on 100 wt parts of the aqueous medium.

* * * * *